Feb. 21, 1933.　　　T. H. THOMAS　　　1,898,510
QUICK SERVICE DEVICE
Filed March 14, 1929
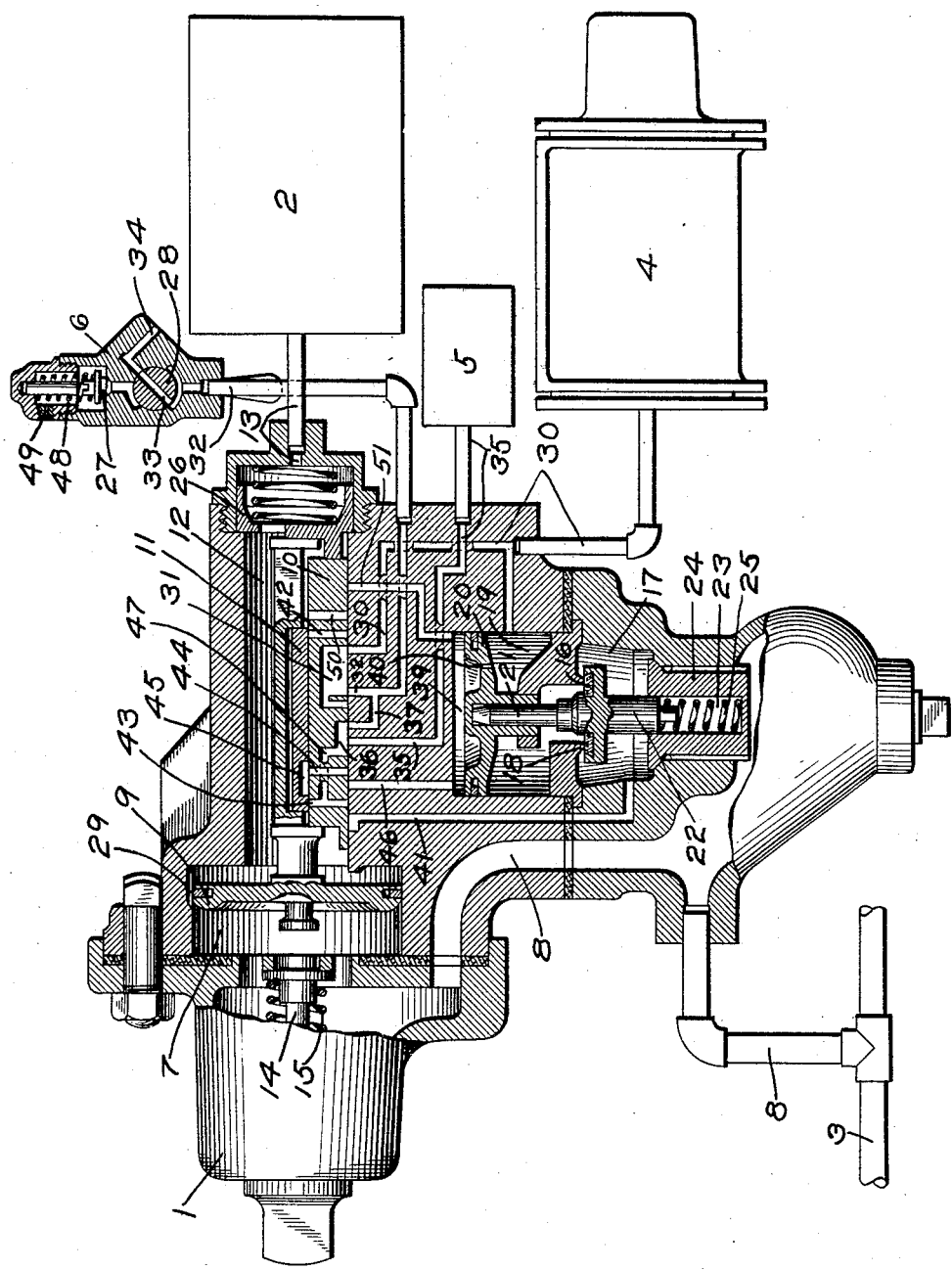
INVENTOR
THOMAS H. THOMAS
BY Wm. M. Cady
ATTORNEY Patented Feb. 21, 1933

1,898,510

UNITED STATES PATENT OFFICE

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

QUICK SERVICE DEVICE

Application filed March 14, 1929. Serial No. 346,952.

This invention relates to fluid pressure brake equipment for railway cars and has for its principal object to provide improved means for effecting a local reduction in brake pipe pressure at each triple valve device in effecting applications of the brakes so as to accelerate the action of the triple valve devices to their service positions.

To propagate quick serial action of the triple valve devices to service position throughout the length of a train it has been the practice to locally vent the brake pipe to either the brake cylinder or a quick service bulb or reservoir and by this practice it may be that on very long trains the local brake pipe reduction will not be sufficient to promptly propagate the quick service action throughout the length of the train.

Another object of my invention is to provide means whereby fluid under pressure is locally vented from the brake pipe to both the brake cylinder and a quick service reservoir so as to accelerate the action of the triple valve devices in effecting an application of the brakes on a long train.

A further object of my invention is to provide a fluid pressure brake equipment embodying means for effecting a local reduction in brake pipe pressure sufficient to propagate a quick serial action throughout the length of a long train in making service applications of the brakes and for effecting a local reduction in brake pipe pressure according to the pressure of fluid retained in the brake cylinder in cycling the brakes.

Other objects and advantages will appear in the following more detailed description of the invention.

In the accompanying drawing, the single figure is a diagrammatic view, mainly in section, of a fluid pressure brake equipment embodying the invention.

According to my invention and as illustrated in the drawing, the fluid pressure brake equipment may comprise a triple valve device 1, an auxiliary reservoir 2, a brake pipe 3, a brake cylinder 4, a quick service bulb or reservoir 5 and a retaining valve device 6.

The triple valve device 1 may comprise a casing having a piston chamber 7 connected to the brake pipe 3 through a pipe and passage 8 and containing a piston 9 which is adapted to operate a main slide valve 10 and a graduating slide valve 11 contained in a chamber 12 which is connected to the auxiliary reservoir 2 through a pipe and passage 13.

Also contained in the piston chamber 7 is the usual graduating stem 14 which is subject to the pressure of a graduating spring 15.

The triple valve device also embodies a quick action mechanism which may comprise a vent valve 16 contained in a chamber 17, and which is adapted to seal against an annular seat ring 18 to close communication from the chamber 17 to a chamber 19 at one side of a quick action piston 20, which piston is mounted on the upper end portion 21 of the piston stem. Below the valve 16, the lower end portion 22 of the valve stem extends into a central bore 23 in a check valve 24 contained in the valve chamber 17. Contained in the bore 23 and interposed between and engaging the stem and the check valve 24 is a coil spring 25.

The triple valve device illustrated in the drawing is of the retarded release type having a spring stop device 26 for resisting the movement of the triple valve parts from full release position, but it will be understood that my improvements may be applied to other types of triple valve devices.

The pressure retaining valve device 6 may be of the usual type having a casing containing a valve 27 adapted to retain a predetermined pressure in the brake cylinder in effecting a release of the brakes in order to maintain the brakes applied while recharging the system. Rotatably mounted in the casing is a plug valve 28 adapted in one position to fully vent the brake cylinder and in another position to permit the valve 27 to control the venting of the brake cylinder.

With the triple valve device 1 in full release position, as shown in the drawing, fluid under pressure supplied to the brake pipe 3 in initially charging the equipment, flows to the auxiliary reservoir 2 through pipe and passage 8, piston chamber 7, a feed groove 29 around the triple valve piston 9, valve chamber 12 and passage and pipe 13.

When the valve 28 is in the position shown in the drawing and the triple valve device is in full release position, the brake cylinder 4 is vented to the atmosphere through a pipe and passage 30, a cavity 31 in the main slide valve 10, a passage and pipe 32, a passage 33 in the valve 28 of the retaining valve device and an atmospheric passage 34. The quick service reservoir 5 is also vented to the atmosphere through pipe and passage 35, a cavity 36 in the main slide valve 10 of the triple valve device, and a passage 37 opening into the passage 32 and then through the retaining valve device as just described.

A chamber 39 at one side of the quick action piston 20 is connected with the chamber 19 at the other side of the piston through a passage 40 in the piston and since the chamber 19 is connected to the brake cylinder passage 30 both of the chambers 39 and 19 are vented to the atmosphere in the same manner as the brake cylinder is vented. With these chambers thus vented the valve 16 is maintained sealed against the seat ring 18 by the pressure of the spring 25.

When the pressure of fluid in the passage 8 acting on the under side of the check valve 24 becomes sufficient to overcome the pressure of the spring 25, said valve is unseated, permitting fluid under pressure to flow from the passage 8 to the valve chamber 17 and to the seat for the main slide valve 10 through a passage 41. Now when the pressures of fluid in the chamber 17 and passage 8 are substantially equal the downward pressure of the spring 25 causes the check valve 24 to again seat.

If it is desired to make a service application of the brakes after the equipment has thus been fully charged, a gradual reduction in brake pipe pressure is effected in the usual manner, and upon effecting such a reduction, the triple valve piston 9 moves outwardly from its full release position, causing the graduating slide valve 11 to first move relatively to the main slide valve 10 and uncover a service port 42 in the main slide valve 10 and connect ports 43 and 44 in the main slide valve by way of a cavity 45 in the graduating slide valve. The continued outward movement of the piston 9 causes the main slide valve 10 together with the slide valve 11 to move to service position, in which the passage 32 leading to the atmosphere is closed off from the brake cylinder passage 30 and in which the service port 42 registers with the brake cylinder passage 30, thus supplying fluid under pressure from the auxiliary reservoir to the brake cylinder 4, and the ports 43 and 44 register with passages 41 and 46 respectively, the latter passage leading to the chamber 39, so that fluid under pressure from the valve chamber 17 is vented to the brake cylinder and to the quick service reservoir 5.

The venting of fluid under pressure from the chamber 17 to the brake cylinder 4 is by way of passage 41, port 43 in the main slide valve 10, cavity 45 in the graduating slide valve 11, port 44 in the main slide valve 10, passage 46, chamber 39, passage 40 in the quick action piston 20, chamber 19 and passage and pipe 30, and the venting of this chamber 17 to the quick service reservoir 5 is by way of passage 41, port 43 in the main slide valve, a passage 47 and cavity 36 in the main slide valve and passage and pipe 35.

With the chamber 17 thus vented, the check valve 24 is unseated against the pressure of the spring 25 by the pressure of fluid in the passage 8, thus venting fluid under pressure from the brake pipe 3 to the quick service reservoir 5 and brake cylinder 4. This local reduction in brake pipe pressure propagates the well known quick serial action throughout the length of the train.

This quick serial action is initiated by the flow of fluid from the brake pipe to the quick service reservoir 5 and is continued by the flow of fluid from the brake pipe to the brake cylinder 4. The volume of the quick service reservoir 5 is such that the quick service action will be initiated promptly without causing surges of fluid in the brake pipe which might cause the triple valve device to unintentionally operate to release position.

To release the brakes after a service application, the brake pipe pressure is increased in the usual manner, causing the triple valve device to operate to full release position, thus venting the brake cylinder 4, chambers 39 and 19 and quick service reservoir 5 to the atmosphere by the way of passage and pipe 32, passage 33 in the valve 28 of the retaining valve device and atmospheric passage 34, and recharging the auxiliary reservoir 2.

Preparatory to descending a grade the valve 28 of the retaining valve device is operated so that the unrestricted atmospheric passage 34 is closed off and the passage 33 in the valve 28 leads to the under side of the valve 27.

When the first application of the brakes is effected on the grade, the triple valve device operates to service position in which fluid under pressure is supplied to the brake cylinder 4 and in which fluid under pressure from the brake pipe 3 is vented to the brake cylinder 4 and to the quick service reservoir 5 in the same manner as hereinbefore described. Now when it is desired to recharge the equipment, the brake pipe pressure is increased causing the triple valve device to operate to release position in which the auxiliary reservoir is recharged and fluid under pressure is vented from the brake cylinder and quick service reservoir 5 by way of passage and pipe 32, passage 33 in the valve 28 of the retaining valve device, past the valve 27 which is unseated against the pressure of the spring 48 and then to atmosphere through a choke plug 49.

The flow of fluid through the choke plug 49 is at a restricted rate until a predetermined brake cylinder pressure is obtained, when the pressure of the spring 48 causes the valve 27 to seat and close off the further flow of fluid from the brake cylinder and quick service reservoir 5 thus maintaining a predetermined pressure in the brake cylinder and reservoir 5. It will here be noted that the pressures of fluid in the brake cylinder and reservoir 5 will be substantially the same and since this is the case, the local reduction in brake pipe pressure, in effecting reapplication of the brakes in cycling on the grade, will be less than if the reservoir 5 had been previously completely vented to the atmosphere instead of being vented with the brake cylinder. If the quick service reservoir 5 were completely vented to the atmosphere each time the triple valve device is operated to release position in cycling, the reduction in brake pipe pressure, in effecting a reapplication of the brakes, would be so great that too high a brake cylinder pressure would be obtained which would result in objectionable violent braking action throughout the train. By maintaining the pressure of fluid in the quick service reservoir 5 substantially equal to the pressure of fluid in the brake cylinder, the reduction in brake pipe pressure will be proportionate to the retained brake cylinder pressure so that the proper gentle braking action is insured throughout the length of the train.

Upon a sudden reduction in brake pipe pressure, the triple valve piston 9 is shifted to emergency position, in which, the passage 41 leading from the chamber 17 and the passage 46 leading to the piston chamber 39 are both lapped by the main slide valve 10 and in which a port 50 registers with the brake cylinder passage 30 and further in which a passage 51 leading to the piston chamber 39 is uncovered. Fluid under pressure is then supplied from the auxiliary reservoir to the brake cylinder 4 and to the piston chamber 39. The pressure of fluid thus supplied to the chamber 39 causes the piston 40 to be shifted so as to unseat the valve 16 and thus permit the venting of fluid from the brake pipe 3 to the brake cylinder to propagate the serial emergency action throughout the train.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, a brake cylinder and a reservoir, of a triple valve device, valve means included in the triple valve device, operative upon effecting a reduction in brake pipe pressure for supplying fluid under pressure to said brake cylinder and for venting fluid under pressure from said brake pipe to said reservoir and brake cylinder to effect a service application of the brakes and operative upon an increase in brake pipe pressure for connecting said brake cylinder and reservoir together and for venting both to the atmosphere to release the brakes.

2. In a fluid pressure brake, the combination with a brake pipe, a brake cylinder, and an auxiliary reservoir and a quick service reservoir, of a triple valve device comprising a movable abutment subject to the opposing pressures of the brake pipe and auxiliary reservoir, and valve means operated by said abutment upon effecting a service reduction in brake pipe pressure for establishing communications through which fluid under pressure is locally vented from the brake pipe to the brake cylinder and quick service reservoir and operated by said abutment upon effecting an increase in brake pipe pressure for establishing a communication through which said quick service reservoir is vented and for also establishing a communication through which the brake cylinder is vented and connected to said quick service reservoir.

3. In a fluid pressure brake, the combination with a brake pipe, a brake cylinder and a reservoir, of a triple valve device, valve means included in the triple valve device operative to supply fluid under pressure to the brake cylinder to effect a service application of the brakes and to establish communications through which fluid under pressure is locally vented from the brake pipe to the brake cylinder and reservoir, and operative to connect the brake cylinder and reservoir and vent fluid under pressure from the brake cylinder and reservoir to effect the release of the brakes.

4. In a fluid pressure brake, the combination with a brake pipe, a brake cylinder and a reservoir, of a triple valve device, valve means included in the triple valve device operative to supply fluid under pressure to the brake cylinder to effect a service application of the brakes and to establish communications through which fluid under pressure is locally vented from the brake pipe to the brake cylinder and reservoir, and operative to establish a communication through which fluid under pressure is vented from said reservoir and to establish another communication through which the brake cylinder is connected to the reservoir and through which fluid under pressure from the brake cylinder is vented.

In testimony whereof I have hereunto set my hand, this 11th day of March, 1929.

THOMAS H. THOMAS.